United States Patent
Sloane et al.

(10) Patent No.: US 10,459,766 B1
(45) Date of Patent: Oct. 29, 2019

(54) SYSTEM FOR OPTIMIZING RESOURCE PRIORITIZATION BASED ON SERVICES EFFICIENCY

(71) Applicant: Bank of America Corporation, Charlotte, NC (US)

(72) Inventors: Brandon Sloane, Santa Barbara, CA (US); Cora Yan Quon, Los Angeles, CA (US); Tracie Buffington Wescott, Charlotte, NC (US); Rachel Yun Kim Bierner, Los Angeles, CA (US); John Howard Kling, Cincinnati, OH (US); Mark Earl Brubaker, Simi Valley, CA (US); Brian Diederich, Simi Valley, CA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/105,608

(22) Filed: Aug. 20, 2018

(51) Int. Cl.
    *G06F 9/46*     (2006.01)
    *G06F 9/50*     (2006.01)
    *G06F 8/65*     (2018.01)

(52) U.S. Cl.
    CPC .............. *G06F 9/5038* (2013.01); *G06F 8/65* (2013.01)

(58) Field of Classification Search
None
See application file for complete search history.

(56) References Cited

U.S. PATENT DOCUMENTS

| | | | |
|---|---|---|---|
| 7,020,617 B2 | 3/2006 | Ouimet | |
| 7,213,037 B2 | 5/2007 | Rangadass | |
| 7,310,646 B2 | 12/2007 | Rangadass et al. | |
| 7,346,529 B2 | 3/2008 | Flores | |
| 7,467,095 B2 | 12/2008 | Ouimet | |
| 7,610,330 B1 | 10/2009 | Quinn et al. | |
| 7,752,562 B2 | 7/2010 | Mohanty et al. | |
| 7,870,004 B2 | 1/2011 | Kananghinis et al. | |
| 8,548,840 B2 | 10/2013 | Anthony et al. | |
| 8,712,812 B2 | 4/2014 | Snow et al. | |
| 9,064,013 B1 * | 6/2015 | Gay | G06F 16/951 |
| 9,202,182 B2 | 12/2015 | Joodi | |
| 9,529,989 B2 | 12/2016 | Kling et al. | |
| 9,536,070 B2 | 1/2017 | Kling et al. | |
| 9,558,334 B2 | 1/2017 | Kling et al. | |
| 9,792,322 B2 | 10/2017 | Merriman et al. | |
| 9,800,480 B1 * | 10/2017 | Eichler | H04L 43/50 |
| 9,898,513 B2 | 2/2018 | McGregor et al. | |
| 10,182,129 B1 * | 1/2019 | Peterson | H04L 67/32 |

(Continued)

*Primary Examiner* — Hiren P Patel
(74) *Attorney, Agent, or Firm* — Michael A. Springs; Moore & Van Allen PLLC; Seongun M. Hong

(57) ABSTRACT

The present disclosure is directed to a novel system for a multidimensional (or "N-dimensional") services framework. The framework may be used to evaluate the efficiency and effectiveness of various services along multiple dimensions which may be specified by the system or be added to the framework in the future. By evaluating the various possibilities and opportunities to modify the services as the services reach varying levels of maturity, the services may be compared with one another to establish the relational impacts among the services tracked by the system. Through the use of the N-dimensional framework, an entity may be better able to prioritize resources allocated toward the enhancement of certain evaluated services.

14 Claims, 3 Drawing Sheets

(56) References Cited

U.S. PATENT DOCUMENTS

| | | | |
|---|---|---|---|
| 10,310,898 B1* | 6/2019 | Helstroom | G06F 9/50 |
| 2004/0117311 A1* | 6/2004 | Agarwal | G06Q 20/102 |
| | | | 705/52 |
| 2005/0021563 A1 | 1/2005 | Shaburov | |
| 2005/0036494 A1 | 2/2005 | Goryaysky | |
| 2006/0036752 A1* | 2/2006 | Lei | H04L 67/322 |
| | | | 709/229 |
| 2007/0239495 A1* | 10/2007 | Osborn | G06Q 10/00 |
| | | | 705/7.28 |
| 2007/0265899 A1 | 11/2007 | Angier et al. | |
| 2007/0266388 A1* | 11/2007 | Jackson | G06F 9/5027 |
| | | | 718/104 |
| 2008/0040364 A1 | 2/2008 | Li | |
| 2010/0250297 A1* | 9/2010 | Channabasavaiah | G06Q 10/06 |
| | | | 705/70 |
| 2010/0293025 A1 | 11/2010 | Carbone et al. | |
| 2013/0067484 A1* | 3/2013 | Sonoda | G06F 9/5038 |
| | | | 718/103 |
| 2013/0268914 A1* | 10/2013 | Oslake | G06F 9/5072 |
| | | | 717/120 |
| 2013/0332935 A1* | 12/2013 | Varma | G06F 9/5011 |
| | | | 718/104 |
| 2013/0346512 A1* | 12/2013 | Thiel | G06F 11/3409 |
| | | | 709/206 |
| 2014/0043973 A1* | 2/2014 | Groenendijk | H04L 41/5032 |
| | | | 370/230 |
| 2015/0088614 A1 | 3/2015 | King | |
| 2015/0302336 A1* | 10/2015 | Dhingra | G06Q 10/06393 |
| | | | 705/7.28 |
| 2016/0162909 A1* | 6/2016 | Akolkar | G06Q 30/0201 |
| | | | 705/7.29 |
| 2017/0019487 A1* | 1/2017 | Maheshwari | H04L 67/16 |
| 2018/0375741 A1* | 12/2018 | Madsen | H04L 41/50 |

* cited by examiner

SYSTEM FOR OPTIMIZING RESOURCE PRIORITIZATION BASED ON SERVICES EFFICIENCY

FIELD OF THE INVENTION

The present disclosure embraces a system, computer program product, and computer-implemented method for optimizing resource prioritization based on services effectiveness and efficiency. In particular, the system may evaluate various services on both individual bases and the interconnected effect of services on one another to assess effectiveness of the services along multiple dimensions.

BACKGROUND

Conventional methods of evaluating the efficiency and effectiveness of individual services may be conducted along a single dimension. That said, there is a need for a way to holistically evaluate various services both individually and in terms of how the services may relate to one another along multiple dimensions.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a novel system for a multidimensional (or "N-dimensional") services framework. The framework may be used to evaluate the efficiency and effectiveness of various services along multiple dimensions which may be specified by the system or be added to the framework in the future. By evaluating the various possibilities and opportunities to modify the services as the services reach varying levels of maturity, the services may be compared with one another to establish the relational impacts among the services tracked by the system. Through the use of the N-dimensional framework, an entity may be better able to prioritize resources allocated toward the enhancement of certain evaluated services.

Accordingly, embodiments of the present disclosure provide a system for using a services framework to optimize resource prioritization. The system comprises a processor; a communication interface; and a memory having executable code stored thereon. The executable code, when executed by the processor, causes the processor to receive, from a user computing system, a request to define a first service within the services framework, wherein the first service comprises a first maturity level; receive, from the user computing system, a request to define a second service within the services framework, wherein the second service comprises a second maturity level; analyze an efficiency of the first service over a first dimension; analyze an efficiency of the second service over the first dimension; determine that a first action causes an increase in the efficiency of the first service over the first dimension; determine that the first action is correlated with an increase in the efficiency of the second service over the first dimension; and implement the first action within the services framework.

In some embodiments, the executable code further causes the processor to: analyze an efficiency of the first service over a second dimension; analyze an efficiency of the second service over the second dimension; determine that a second action causes an increase in the efficiency of the first service over the second dimension; determine that the second action is correlated with an increase in the efficiency of the second service over the second dimension; and implement the second action within the services framework.

In some embodiments, the executable code further causes the processor to determine that the first action is correlated with an increase in the efficiency of the second service over the second dimension.

In some embodiments, the executable code further causes the processor to determine that the second action is correlated with an increase in the efficiency of the first service over the first dimension.

In some embodiments, the executable code further causes the processor to detect a user-defined pattern from the request to define the first service and the request to define the second service; and based on the user-defined pattern, automatically define a third service within the services framework, wherein the third service comprises a third maturity level.

In some embodiments, the first service comprises data loss prevention processes with respect to mobile devices and the second service comprises data loss prevention process with respect to e-mail communications.

In some embodiments, implementing the first action comprises establishing a communication link with a mobile device associated with a second user; and automatically pushing a software update to the mobile device associated with the second user.

Embodiments of the present disclosure further provide a computer program product for using a services framework to optimize resource prioritization, the computer program product comprising at least one non-transitory computer readable medium having computer-readable program code portions embodied therein. The computer-readable program code portions comprise an executable portion for receiving, from a user computing system, a request to define a first service within the services framework, wherein the first service comprises a first maturity level; an executable portion for receiving, from the user computing system, a request to define a second service within the services framework, wherein the second service comprises a second maturity level; an executable portion for analyzing an efficiency of the first service over a first dimension; an executable portion for analyzing an efficiency of the second service over the first dimension; an executable portion for determining that a first action causes an increase in the efficiency of the first service over the first dimension; an executable portion for determining that the first action is correlated with an increase in the efficiency of the second service over the first dimension; and an executable portion for implementing the first action within the services framework.

In some embodiments, the computer-readable program code portions further comprise an executable portion for analyzing an efficiency of the first service over a second dimension; an executable portion for analyzing an efficiency of the second service over the second dimension; an executable portion for determining that a second action causes an increase in the efficiency of the first service over the second dimension; an executable portion for determining that the second action is correlated with an increase in the efficiency of the second service over the second dimension; and an executable portion for implementing the second action within the services framework.

In some embodiments, the computer-readable program code portions further comprise an executable portion for determining that the first action is correlated with an increase in the efficiency of the second service over the second dimension.

In some embodiments, the computer-readable program code portions further comprise an executable portion for determining that the second action is correlated with an increase in the efficiency of the first service over the first dimension.

In some embodiments, the computer-readable program code portions further comprise an executable portion for detecting a user-defined pattern from the request to define the first service and the request to define the second service; and an executable portion for, based on the user-defined pattern, automatically defining a third service within the services framework, wherein the third service comprises a third maturity level.

Embodiments of the present disclosure further provide a computer-implemented method for using a services framework to optimize resource prioritization. The method comprises receiving, from a user computing system, a request to define a first service within the services framework, wherein the first service comprises a first maturity level; receiving, from the user computing system, a request to define a second service within the services framework, wherein the second service comprises a second maturity level; analyzing an efficiency of the first service over a first dimension; analyzing an efficiency of the second service over the first dimension; determining that a first action causes an increase in the efficiency of the first service over the first dimension; determining that the first action is correlated with an increase in the efficiency of the second service over the first dimension; and implementing the first action within the services framework.

In some embodiments, the method further comprises analyzing an efficiency of the first service over a second dimension; analyzing an efficiency of the second service over the second dimension; determining that a second action causes an increase in the efficiency of the first service over the second dimension; determining that the second action is correlated with an increase in the efficiency of the second service over the second dimension; and implementing the second action within the services framework.

In some embodiments, the method further comprises determining that the first action is correlated with an increase in the efficiency of the second service over the second dimension.

In some embodiments, the method further comprises determining that the second action is correlated with an increase in the efficiency of the first service over the first dimension.

In some embodiments, the method further comprises detecting a user-defined pattern from the request to define the first service and the request to define the second service; and based on the user-defined pattern, automatically defining a third service within the services framework, wherein the third service comprises a third maturity level.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
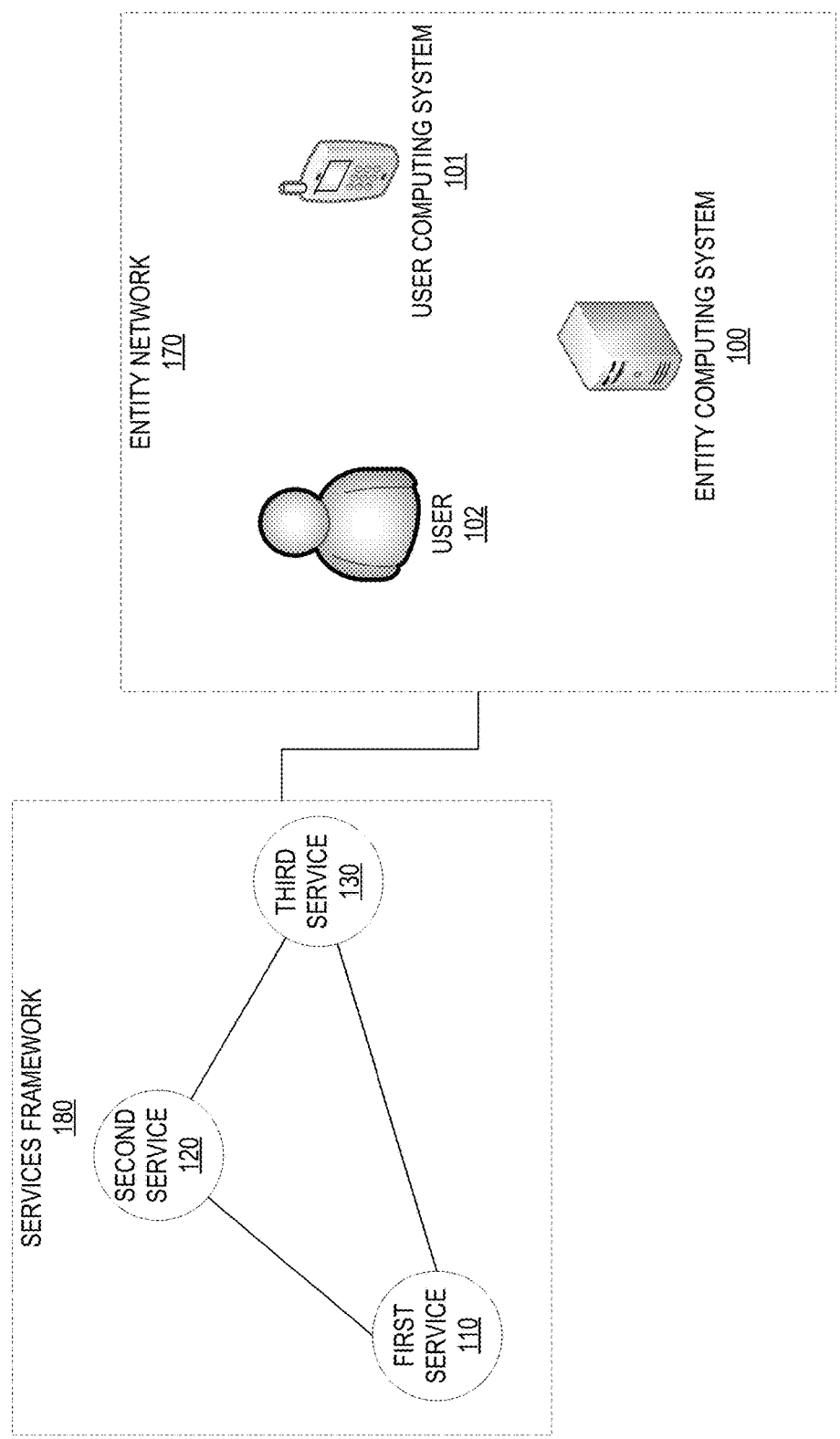
Figure 2:
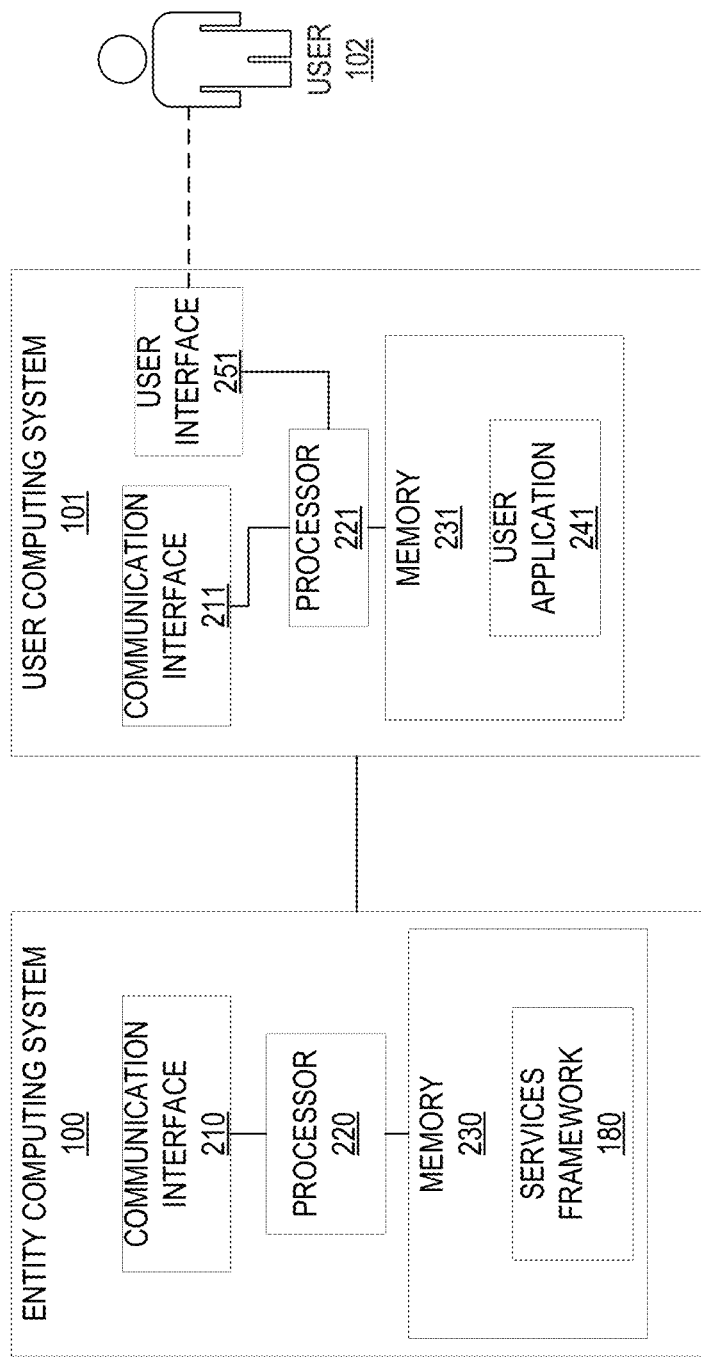
Figure 3:
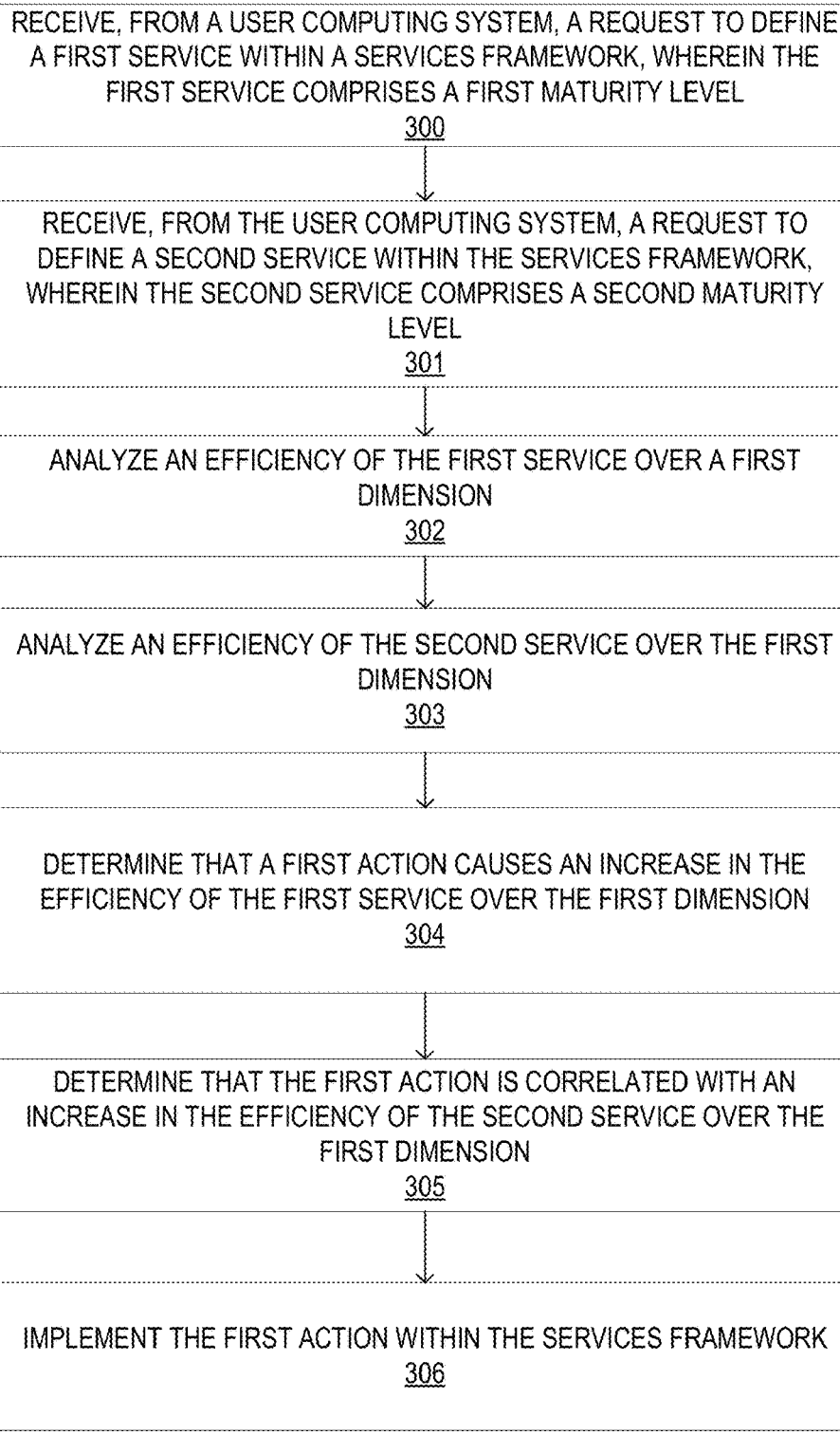

Having thus described embodiments of the disclosure in general terms, reference will now be made to the accompanying drawings, wherein:

FIG. 1 is a block diagram illustrating an operating environment for the entity system, in accordance with some embodiments of the present disclosure;

FIG. 2 is a block diagram illustrating the entity computing system and the user computing system in more detail; and FIG. 3 is a process flow for an application of the services framework, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the services framework system described herein is implemented. The entity may be a business organization, a non-profit organization, a government organization, and the like.

"Entity system" or "services framework system" as used herein may refer to the computing systems, devices, and/or other resources used by the entity to operate the services framework.

"User" as used herein may refer to an individual who may interact with the entity system to access the services framework.

"Computing system" or "computing device" as used herein may refer to a networked computing device within the entity system. The computing system may include a processor, a non-transitory storage medium, a communications device, and a display. The computing system may support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like within an entity's premises. In some embodiments, the computing system may be a local or remote server which is configured to send and/or receive inputs from other computing systems on the network.

"Resource" as used herein may refer to both physical and non-physical objects used by the entity to accomplish the entity's objectives. Accordingly, "resource" may include computing resources, data files, documents, funds, or the like.

"Service" as used herein may refer to a solution or collection of solutions to various problems faced by an entity. For instance, an exemplary "service" or collection of "services" may refer to a combination of hardware and software dedicated to resolving cybersecurity issues associated with various communication channels.

Embodiments of the present disclosure provide a system, computer program product, and method for optimizing resource prioritization based on services effectiveness and efficiency. An entity may use numerous services in order to fulfill the entity's objectives. For instance, an entity may use hardware, software, and/or process-oriented solutions to resolve cybersecurity or data loss issues across various channels. The disclosure provided herein presents a novel system for analyzing and evaluating not only the individual efficiency, effectiveness, and/or capabilities of each service within the entity's systems, but also the interconnectedness of each service as it relates to other services across multiple dimensions.

Each service associated with a particular theme or objective (e.g., detection of cybersecurity threats via a certain communication channel) may be in varying stages of maturity in the service's lifecycle. For the purposes of the services framework, each service may be categorized according to discrete maturity levels (e.g., levels 1 through 5). For instance, a maturity level of "1" may correspond to an "ad hoc" service, which may be a service that is decentralized and inconsistent in its application, whereas a maturity level of "5" may correspond to an optimized service, which may be a service that has reached a high level of effectiveness and efficiency. As an entity continually uses the framework to define maturity levels for the various services in use by the entity, the framework may allow the entity to assess not only what must be done to increment a service's maturity level (e.g., what resources will need to be allocated to further increase the effectiveness and/or efficiency of a service), but also what effect an increase in a particular service's maturity level will have on other services. By correlating the increases in effectiveness and efficiency of a service and the associated effects on the remaining services, an entity may be able to gain a more holistic understanding of the interconnectedness of services within the services framework. As a result, an entity may be able to optimally allocate resources to improve various services along multiple dimensions to obtain the greatest possible increase in effectiveness and efficiency from an individual service perspective as well as a system-wide services perspective.

The following description provides an exemplary use case to further illustrate the system as described herein. It should be recognized that the following use case is provided for illustrative purposes only and should not be construed to limit the scope of the disclosure herein. In an exemplary embodiment, an entity system may comprise various cybersecurity services associated with data loss prevention. For instance, an entity may use one or more services designed to prevent data loss through e-mail, which may be assigned a maturity level of "3." In addition, the entity may use one or more services designed to prevent data loss through mobile devices within the entity system, which may be assigned a maturity level of "4." By defining the various services using the services framework, the entity may be able to identify the resources needed to increment the services' maturity levels by making improvements along certain dimensions. For instance, increasing the maturity level of the services designed to prevent data loss through e-mail may involve the installation of data control applications and/or procedures, increased security policies (e.g., password requirements), access restrictions, inbox/outbox settings, or the like. On the other hand, increasing the maturity level of the services designed to prevent data loss through mobile devices may involve the installation of encryption software, multi-level authentication procedures, device software updates, or the like.

Once the individual services have been defined using the framework, the entity may then use the framework to identify correlations between changes or improvements to one service or dimension and the effects said changes or improvements may have on other services or dimensions. For instance, the entity may be able to determine that improvements to services designed to prevent data loss through mobile devices along certain dimensions (e.g., device security improvements, incoming/outgoing rules, data control policies, or the like) may help create positive effects on services relating to preventing data loss through e-mail (e.g., installing data encryption software on mobile devices may reduce data loss for users who may use their mobile devices to send and receive e-mail). Through establishing relationships as described above, an entity may obtain a holistic understanding of how improvements in certain services along certain dimensions (e.g., improvements in data security on mobile devices) may impact other services along other dimensions (e.g., improvements in e-mail or web browser data security).

The system as disclosed herein addresses a number of technology-centric challenges. In particular, the services framework, by allowing an entity to understand the implications of upgrading various technological services, may allow the entity to optimally allocate resources to improving various aspects of the entity's technological infrastructure. Said resources may include the computing resources (e.g., processing power, memory space, storage space, cache space, electric power, networking bandwidth, or the like) needed to implement the changes to the entity's services. Furthermore, in embodiments in which the services relate to data security, the services framework may allow the entity to realize the greatest increase in efficiency and effectiveness of data security services for the resources spent.

Referring now to the figures, FIG. 1 is a block diagram illustrating an operating environment for the entity system, in accordance with some embodiments of the present disclosure. In particular, the entity system may comprise a plurality of entity computing systems 100 communicatively coupled with one another via an entity network 170. The entity network 170, as well as other networks as described herein, may be a global area network (GAN), such as the Internet, a wide area network (WAN), a local area network (LAN), or any other type of network or combination of networks. The network may provide for wireline, wireless, or a combination wireline and wireless communication between devices on the network.

The entity computing systems 100 may be computing systems on which the entity's services framework 180 is implemented. Accordingly, the entity computing systems 100 are typically networked terminals or servers, but may also be desktop computers, laptops, smartphones or smart devices, Internet-of-Things ("IoT") devices, or the like, or any combination thereof. In some embodiments, the entity computing systems 100 may be a desktop terminal operated by a user 102 (e.g., a systems administrator or other agent of the entity) to access the services framework to access the functions therein. In other embodiments, the entity computing system 100 may be a database server which houses the data regarding the various services and dimensions along with the relationships and connectedness of services and dimensions to one another.

The entity network 170 may further comprise a user computing system 101 which may be operated by the user 102. In some embodiments, the user computing system 101 may also be used to access the services framework hosted on the entity computing systems 100. In other embodiments, the user computing system 101 may be an entity owned device which is subject to the various services operated by the entity (e.g., data control processes, data security software, or the like).

As described above, the entity computing systems 100 may host the services framework 180. The services framework 180 may comprise a defined list of services that the entity may use during its operations. In an exemplary embodiment, the services framework 180 may comprise a first service 110, a second service 120, and/or a third service 130. Each service may comprise a collection of devices, software, and/or procedures configured to address a certain objective (e.g., mobile data security). The services may be either user-defined (e.g., a user may create definitions for services within the services framework 180), or they may be system-defined (e.g., the system automatically generates definitions for services within the services framework 180). Once the services have been defined within the services framework 180, the entity computing systems 100 may determine relationships among the various services 110, 120, and 130. For example, the entity system may determine the effects of an improvement to a first dimension of the first service 110 on the second service 120 and/or the third service 130. The entity system may further determine the effects of an improvement to a second dimension of the second service 120 on the first service 110 and the third service 130, and so on. As more services become defined within the services framework 180, more complex relationships and patterns may emerge, which may allow the entity to accurately determine the most resource efficient and effective way to augment various services to achieve the entity's objectives.

It should be understood by those having ordinary skill in the art that although the entity computing system 100, the user computing system 101, and the user 102 are depicted as single units, each of the depicted components, or sub-components therein, may represent multiple units. In some embodiments, a given computing system as depicted in FIG. 1 or any of the remaining figures may represent multiple systems configured to operate in a distributed fashion. For instance, the entity computing system 100 may represent a plurality of computing systems operating in a distributed fashion. In other embodiments, the functions of multiple computing systems may be accomplished by a single system. For instance, the functions of the entity computing system 100 and the user computing system 101 may, in some embodiments, be executed on a single computing system according to the entity's need to efficiently distribute computing workloads. It should further be understood that while the services framework 180 is depicted in FIG. 1 as comprising three distinct services, the services framework 180 may comprise fewer or more services according to the needs of the entity.

FIG. 2 is a block diagram illustrating the entity computing system 100 and the user computing system 101 in more detail, in accordance with some embodiments of the present disclosure. The entity computing system 100 may comprise a processor 220 communicably coupled to such devices as a communication interface 210 and a memory 230. The processor 220, and other processors described herein, typically includes circuitry for implementing communication and/or logic functions of the computing systems or devices as described herein. For example, the processor 220 may include a digital signal processor device, a microprocessor device, and various analog to digital converters, digital to analog converters, and/or other support circuits. The entity computing system 100 may use the communication interface 210 to communicate with other devices over the entity network 170. The communication interface 210 as used herein may include an Ethernet interface or other type of data port, an antenna coupled to a transceiver configured to operate on a cellular data, GPS, or WiFi signal, and/or a near field communication ("NFC") interface. In some embodiments, a processing device, memory, and communication device may be components of a controller, where the controller executes one or more functions based on the code stored within the memory.

The memory 230 of the entity computing system 100 may comprise the services framework 180. As used herein, memory includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like.

Typically, the entity computing system 100 hosts the various applications and/or data stores necessary to maintain the services framework 180. Accordingly, the services framework 180 as depicted in FIG. 2 may comprise definitions for the various services used by the entity, data regarding the connections and relationships between and among services, an application which allows the user 102 to use, view, modify, add, delete, or otherwise access the services, relationships, maturity levels, and the like within the services framework 180. In some embodiments, said application may be a web-based service or other type of server which the user 102 may access via the user computing system 101.

The user computing system 101 may also comprise a 221 communicatively coupled with such devices as a communication interface 211 and a memory 231. Typically, the user computing system 101 interacts with the entity computing system 100 to access the services framework 180. In other embodiments, the user computing system 101 may not interact directly with the services framework 180 but may be subject to the services within the services framework 180 (e.g., software update policy). Accordingly, the user computing system 101 may be a desktop computer, networked terminal, laptop computer, tablet, smartphone, or the like.

The memory 231 of the user computing system 101 may store a user application 241 therein. Typically, the user application 241 is an entity-provided application or third party application (e.g., a web browser) that allows the user 102 to use the user computing system 101 to access the services framework 180 of the entity computing system 100. Accordingly, the user 102 may, via the user application 241, define services, dimensions, maturity levels, or other types of data within the services framework 180, view various types of data (e.g., relationships between established services, consequences of incremental improvements to certain dimensions of certain services, or the like), maintain or update the services framework 180, or the like.

In some embodiments, the user computing system 101 may be configured to accept inputs from a user (e.g., an employee or client of the entity) who may use the user computing system 101 to access the features of the services framework 180 of the entity computing system 100. In this regard, the user computing system 101 may further comprise a user interface 251, which may comprise the hardware and software implements to accept input from and provide output to the user 102. The user interface 251 may comprise hardware such as a display, audio output devices, projectors, and the like, or input devices such as keyboards, mice, sensors, cameras, microphones, biometric input devices (e.g., fingerprint readers), and the like. The user interface 251 may further comprise software such as a graphical or command-line interface through which the user 102 may provide inputs and/or receive outputs from the user computing system 101. It should be understood that the display on which the user interface is presented may include an integrated display (e.g. a tablet or smartphone screen) within the user computing system 101, or an external display device (e.g. a computer monitor or television).

FIG. 3 is a process flow for an application of the services framework, in accordance with some embodiments of the present disclosure. The process begins at block 300, where the system receives, from a user computing system, a request to define a first service within a services framework, wherein the first service comprises a first maturity level. A user, who may be an employee or administrator of an entity, may define services according to certain objectives of the entity. For instance, an objective of the entity may be data loss prevention measures across multiple communication channels. Accordingly, the user may define one or more cybersecurity services within the services framework. In an exemplary embodiment, the first service defined by the user may be data loss prevention measures associated with mobile devices. Accordingly, such data loss prevention measures may include the installation of data encryption software, critical security updates, data control policies, anti-malware software, or the like.

Although the various services within the services framework are typically user defined, it is within the scope of the present disclosure for the services to be automatically defined by the entity system. For instance, the entity system may detect a pattern of services that have been defined by the user (e.g., the user has defined cybersecurity services for various communication channels, such as e-mail or mobile channels). In such an embodiment, the entity system may, based on the pattern of defining services, use machine learning to determine that a new service should be defined for a new communication channel (e.g., videoconferencing). In this way, the system may dynamically generate new services and automatically analyze the efficiency and effectiveness of the service in relation to the other services that have been defined within the services framework.

The process continues to block 301, where the system receives, from the user computing system, a request to define a second service within the services framework, wherein the second service comprises a second maturity level. Continuing the above example, the user may further define the second service as a cybersecurity service to for data loss prevention measures associated with e-mail communications. Accordingly, the second service may include various measures such as device security requirements, login credential requirements, access control and/or restrictions, or the like.

The first service and the second service, along with any other service defined within the services framework, may each be assigned a maturity level which reflects the degree to which the service has been optimized toward a particular objective. Typically, the maturity level may correspond to a discrete value (e.g., an integer, decimal number, fraction, or the like). A higher value of maturity level corresponds to a more developed and sophisticated service that has been optimized for effectiveness and efficiency (e.g., uses a refined set of hardware, software, and policies to efficiency achieve the objective), while a lower value of maturity level corresponds to a less developed service which may be decentralized, less efficient, and/or inconsistently applied.

The process continues to block 302, where the system analyzes an efficiency of the first service over a first dimension. The system may analyze the efficiency of the first service by comparing the amount of resources allocated toward the service versus the effectiveness of the service (e.g., the reduction in data loss incidents through a particular communication channel). Continuing the above example, the system may assess the resources being allocated to the data loss prevention measures with respect to mobile devices and further assess the reduction in data loss incidents through mobile devices. The service may be assessed over various dimensions, such as threat identification, data control policies, technology management, threat management, or the like.

The process continues to block 303, where the system analyzes an efficiency of the second service over the first dimension. Continuing the above example, the system may further assess the amount of resources being allocated toward data loss prevention measures with respect to e-mail communications as well as the reduction in data loss incidents through e-mail communications. In some embodiments, the system may further analyze an efficiency of the second service (or the first service) over a second dimension, such as the ability of the service to identify data loss threats.

The process continues to block 304, where the system determines that a first action causes an increase in the efficiency of the first service over the first dimension. For example, the system may determine that it is possible to increase the efficiency of the first service (e.g., data loss prevention with respect to mobile devices) over a first dimension (e.g., threat management) by installing an anti-malware software suite on a user's mobile device (e.g., by reducing the number of data loss incidents due to malware infections on the mobile device). In some embodiments, the first action (e.g., installation of anti-malware) may further create an increase in the efficiency of the first service over a second dimension (e.g., the anti-malware software increases the threat detection abilities of the service). In some embodiments, the increased efficiency of the first service across one or more dimensions may cause an increase in the maturity level associated with the service.

The process continues to block 305, where the system determines that the first action is correlated with an increase in the efficiency of the second service over the first dimension. The system may further determine that the implementation of the anti-malware software may also increase the efficiency of the second service (e.g., data loss prevention with respect to e-mail) along the first dimension (e.g., by reducing the number of data loss incidents due to malware that targets e-mail communications) and/or along the second dimension (e.g., by increasing the chance of detecting a malware threat that targets e-mail communications). Accordingly, implementing the first action may further lead to an increment in the maturity level value for the second service.

The process concludes at block 306, where the system implements the first action within the services framework. The method of implementation may depend on the nature of the first action. For instance, in continuing the above example, the first action may involve the installation of the anti-malware software on all mobile devices within the entity system. In such embodiments, the system may be configured to establish a communication link with a user's mobile devices and automatically push an installation script to the user's mobile device to install the anti-malware software. In other embodiments, the first action may be a data access control policy (e.g., an access restriction or web content filtering setting with respect to a website known to be a data loss threat) which may be implemented server-side within an entity's systems. In such embodiments, the system may automatically update the content filters within an entity's system to reflect the new access control policy. In other embodiments, the system may be configured to allow a user to manually implement actions within the services framework.

In some embodiments, the system may be configured to interact with the user via a graphical interface. For instance, the system may receive a request from the user to view a list of services and/or the relationships among services. In such embodiments, the system may, via a web server or the like, display a graphical user interface to the user computing system of the user, where the graphical user interface comprises a list of services defined within the services framework, in addition to the various relationships established between or among the defined services.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for using a services framework to optimize resource prioritization, the system comprising:
   a processor;
   a communication interface; and
   a memory having executable code stored thereon, wherein the executable code, when executed by the processor, causes the processor to:
   receive, from a user computing system, a request to define a first service within the services framework, wherein the first service comprises a first maturity level;
   receive, from the user computing system, a request to define a second service within the services framework, wherein the second service comprises a second maturity level;
   analyze an efficiency of the first service over a first dimension;
   analyze an efficiency of the second service over the first dimension;
   determine that a first action causes an increase in the efficiency of the first service over the first dimension;
   determine that the first action is correlated with an increase in the efficiency of the second service over the first dimension;
   implement the first action within the services framework;
   analyze an efficiency of the first service over a second dimension;
   analyze an efficiency of the second service over the second dimension;
   determine that a second action causes an increase in the efficiency of the first service over the second dimension;
   determine that the second action is correlated with an increase in the efficiency of the second service over the second dimension;
   implement the second action within the services framework;
   detect a user-defined pattern from the request to define the first service and the request to define the second service; and
   based on the user-defined pattern, automatically define a third service within the services framework, wherein the third service comprises a third maturity level.

2. The system of claim 1, wherein the executable code further causes the processor to:
   determine that the first action is correlated with an increase in the efficiency of the second service over the second dimension.

3. The system of claim 1, wherein the executable code further causes the processor to:
   determine that the second action is correlated with an increase in the efficiency of the first service over the first dimension.

4. The system of claim 1, wherein the first service comprises data loss prevention processes with respect to mobile devices, wherein the second service comprises data loss prevention process with respect to e-mail communications.

5. The system of claim 4, wherein implementing the first action comprises:
   establishing a communication link with a mobile device associated with a second user; and
   automatically pushing a software update to the mobile device associated with the second user.

6. A computer program product for using a services framework to optimize resource prioritization, the computer program product comprising at least one non-transitory computer readable medium having computer-readable program code portions embodied therein, the computer-readable program code portions comprising:
   an executable portion for receiving, from a user computing system, a request to define a first service within the services framework, wherein the first service comprises a first maturity level;
   an executable portion for receiving, from the user computing system, a request to define a second service within the services framework, wherein the second service comprises a second maturity level;
   an executable portion for analyzing an efficiency of the first service over a first dimension;
   an executable portion for analyzing an efficiency of the second service over the first dimension;
   an executable portion for determining that a first action causes an increase in the efficiency of the first service over the first dimension;
   an executable portion for determining that the first action is correlated with an increase in the efficiency of the second service over the first dimension;
   an executable portion for implementing the first action within the services framework;
   an executable portion for analyzing an efficiency of the first service over a second dimension;
   an executable portion for analyzing an efficiency of the second service over the second dimension;
   an executable portion for determining that a second action causes an increase in the efficiency of the first service over the second dimension;
   an executable portion for determining that the second action is correlated with an increase in the efficiency of the second service over the second dimension;
   an executable portion for implementing the second action within the services framework;

an executable portion for detecting a user-defined pattern from the request to define the first service and the request to define the second service; and an executable portion for, based on the user-defined pattern, automatically defining a third service within the services framework, wherein the third service comprises a third maturity level.

7. The computer program product of claim 6, wherein the computer-readable program code portions further comprise:

an executable portion for determining that the first action is correlated with an increase in the efficiency of the second service over the second dimension.

8. The computer program product of claim 6, wherein the computer-readable program code portions further comprise:

an executable portion for determining that the second action is correlated with an increase in the efficiency of the first service over the first dimension.

9. The computer program product of claim 6, wherein the first service comprises data loss prevention processes with respect to mobile devices, wherein the second service comprises data loss prevention process with respect to e-mail communications.

10. A computer-implemented method for using a services framework to optimize resource prioritization, the method comprising:

receiving, from a user computing system, a request to define a first service within the services framework, wherein the first service comprises a first maturity level;

receiving, from the user computing system, a request to define a second service within the services framework, wherein the second service comprises a second maturity level;

analyzing an efficiency of the first service over a first dimension;

analyzing an efficiency of the second service over the first dimension;

determining that a first action causes an increase in the efficiency of the first service over the first dimension;

determining that the first action is correlated with an increase in the efficiency of the second service over the first dimension;

implementing the first action within the services framework;

analyzing an efficiency of the first service over a second dimension;

analyzing an efficiency of the second service over the second dimension;

determining that a second action causes an increase in the efficiency of the first service over the second dimension;

determining that the second action is correlated with an increase in the efficiency of the second service over the second dimension;

implementing the second action within the services framework;

detecting a user-defined pattern from the request to define the first service and the request to define the second service; and based on the user-defined pattern, automatically defining a third service within the services framework, wherein the third service comprises a third maturity level.

11. The computer-implemented method of claim 10, wherein the method further comprises:

determining that the first action is correlated with an increase in the efficiency of the second service over the second dimension.

12. The computer-implemented method of claim 10, wherein the method further comprises:

determining that the second action is correlated with an increase in the efficiency of the first service over the first dimension.

13. The computer-implemented method of claim 10, wherein the first service comprises data loss prevention processes with respect to mobile devices, wherein the second service comprises data loss prevention process with respect to e-mail communications.

14. The computer-implemented method of claim 13, wherein the method further comprises:

establishing a communication link with a mobile device associated with a second user; and automatically pushing a software update to the mobile device associated with the second user.

\* \* \* \* \*